UNITED STATES PATENT OFFICE.

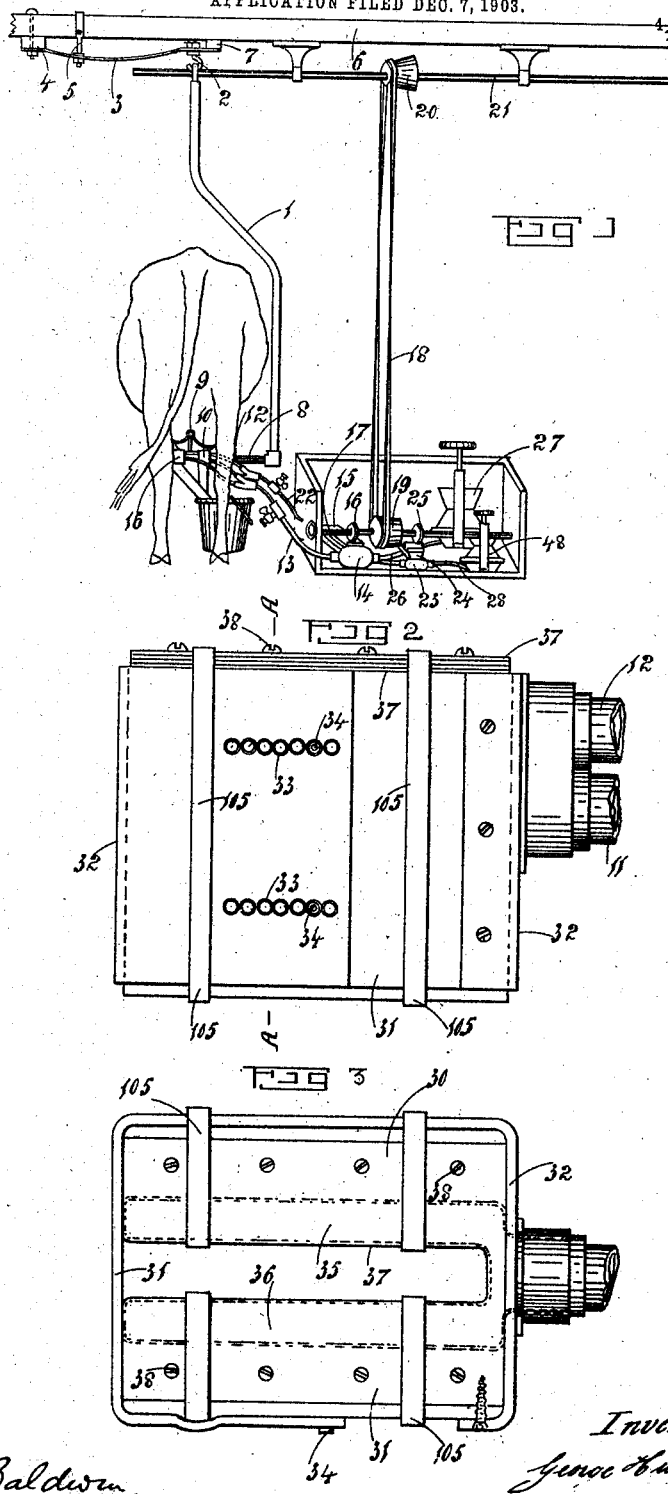

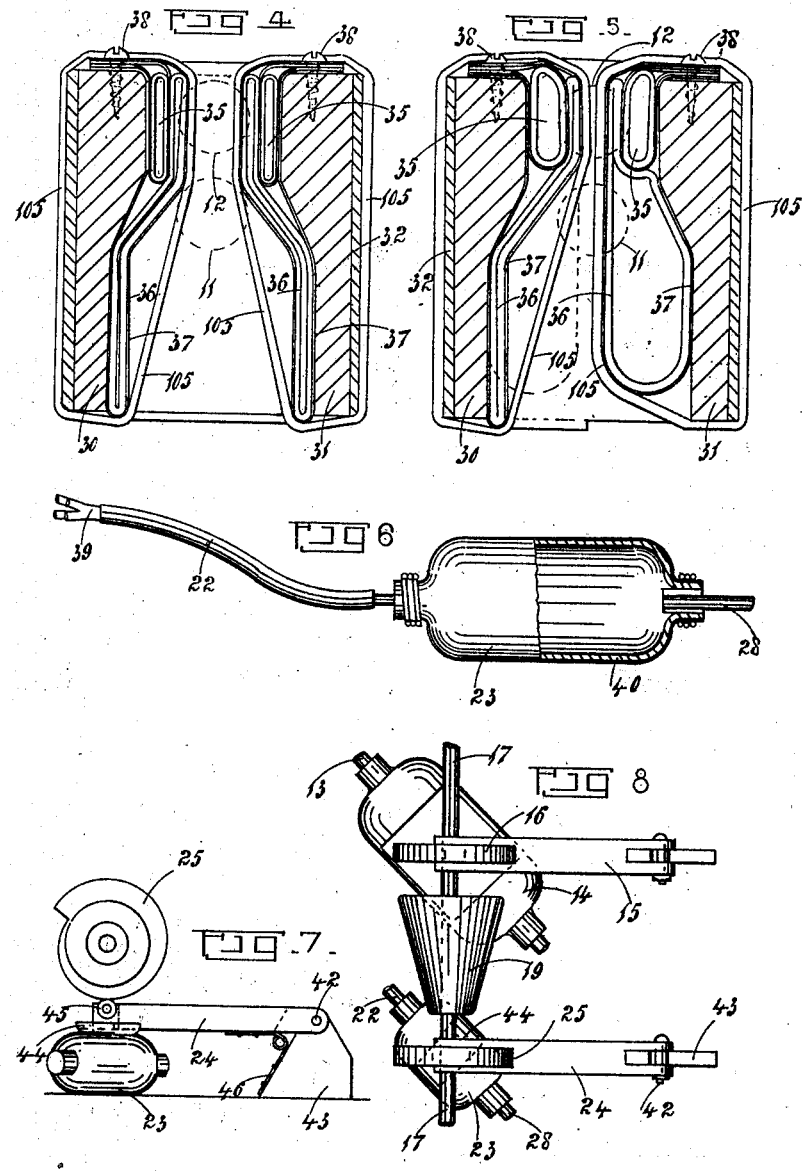

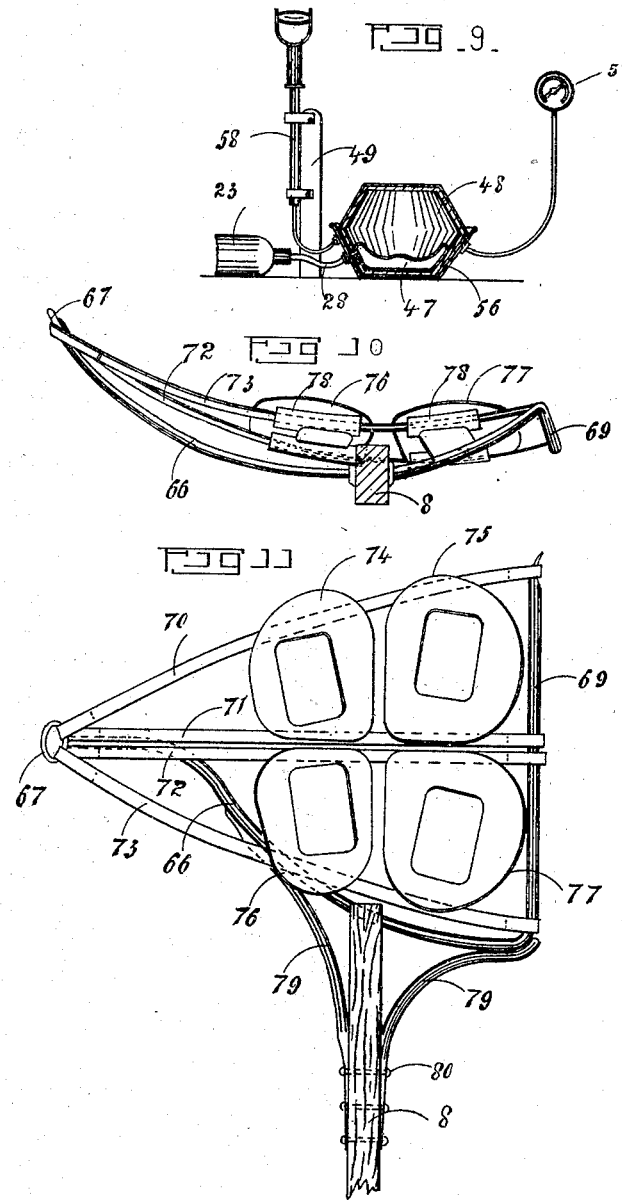

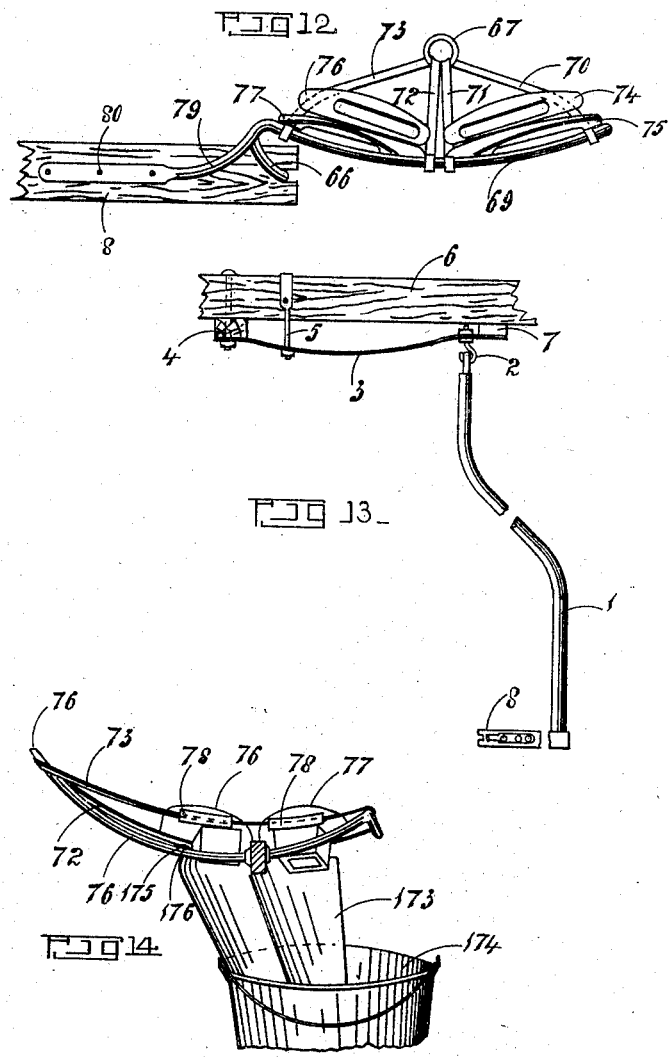

GEORGE HUTCHINSON, OF SEATOUN, NEW ZEALAND.

MILKING-MACHINE.

No. 814,212.      Specification of Letters Patent.      Patented March 6, 1906.

Application filed December 7, 1903. Serial No. 184,216.

*To all whom it may concern:*

Be it known that I, GEORGE HUTCHINSON, a subject of His Majesty the King of Great Britain and Ireland, residing at Seatoun, Wellington, in the Colony of New Zealand, have invented certain new and useful Improvements in Milking-Machines, of which the following is a specification.

This invention relates to the milking of cows and other animals.

The essential feature of my invention consists in the employment of fluid, either liquid or gaseous, under pulsative pressure in a teat-press which receives the teat of the animal, the pressure being applied to the teat in such manner as to express milk therefrom. In practice I employ what I term "squeezers," which are contained in each teat-press. A teat-press is used upon each teat and the whole or any number of teats of an animal are operated upon simultaneously. Several machines may be connected and driven from a single source of power, so that a number of animals may be milked at the same time, and means may be employed to regulate the pressure and speed to suit the individual animal. The upper squeezer in the teat-press is first brought into operation, and by pressing on a small part of the teat near its upper end prevents milk from escaping upwardly into the udder. The remaining squeezers then come into operation, commencing with the upper squeezer, and by pressing on the remainder of the teat express milk into a receptacle. The squeezers consist of a series of tubular rings or pouches surrounding or parpartially surrounding the teat, and fluid-pressure is admitted to and allowed to escape from each of them independently and at required intervals, whereby the teat is acted upon by lateral pressure of the squeezers. Cups may receive the milk issuing from the teat and tubes be employed to convey the milk to a receptacle, or a large conveyer may collect all the milk from the four teats and conduct it to a receptacle. Where required, the teat-presses are provided with hinge-joints or other arrangement to allow of their being opened to insert the teat and suitable catches are used to keep them shut. For operating the squeezers water is employed in bags of flexible material which are alternately compressed and released by levers operated by rotating cams. The water is led to the teat-presses through suitable tubes, and when pressure is withdrawn from the bags flows out of the teat-presses by the action of gravity.

My invention is illustrated in the accompanying drawings, wherein—

Figure 1 is a rear perspective elevation showing a general arrangement of parts comprising a milking-machine; Fig. 2, a side elevation, and Fig. 3 a corresponding plan, of a form of teat-press in which a plurality of tubular rings or pouches, partially surrounding the teat, is employed. Fig. 4 is a vertical section on line A A, Fig. 2; Fig. 5, a view similar to Fig. 4, showing the operation of the tubular rings or pouches. Fig. 6 is a side elevation, partly in section, of a pulsation-bag; Fig. 7, a side elevation of apparatus for actuating the pulsation-bag; Fig. 8, a corresponding plan; Fig. 9, a front sectional elevation of a pressure-regulator. Fig. 10 is a side elevation of the cradle, and Figs. 11 and 12, respectively, a plan and front end elevation thereof. Fig. 13 is a side elevation of the cradle-supporting bracket. Fig. 14 is a side elevation showing the cradle and tubes conducting milk to a receptacle.

Referring first more particularly to Fig. 1, the bracket 1 is connected at its upper end by a hook 2 to the outer end of a comparatively long flat spring 3, which is bolted to a beam 4. The spring passes between the bolts 5 of a double strap-bolt looped over a beam 6, nuts upon the bolts enabling the initial tension of the spring to be regulated as desired. The end of the spring 3 normally bears against the stop 7 when the apparatus is out of work. The arm 8, projecting laterally from the bracket 1, supports a cradle 9, to the lower side of which are connected the teat-presses 10, one for each teat. The point at which the bracket is connected to the spring 3 is adjusted so that a vertical line from the point of connection will pass through the middle of the cradle when in use, the object of so suspending it being to allow slight movement of the animal to take place without materially altering the position and pressure of the apparatus in relation to the udder.

In the form of teat-press indicated in Fig. 1 and shown in detail in Figs. 2 to 5, inclusive, each teat-press has two branch pipes 11 and 12, the whole series of pipes 11 from the lower tubular rings or pouches of a plurality of teat-presses being coupled and connected to a pipe 13, communicating with the pulsation-bag 14, and the whole series of pipes 12 from the corresponding upper tubular rings or pouches of the same series of teat-presses being coupled to a pipe 22, communicating with the pulsation-bag 23. The pulsation-bag 14 is arranged beneath a lever 15, which is operated upon by a cam 16 upon a shaft 17, revolved by a belt 18, passing around a conical pulley 19 on the said shaft and around a corresponding pulley 20 upon the main shaft 21. The pulsation-bag 23 is arranged beneath a lever 24, operated upon by a cam 25 upon the shaft 17. The pulsation-bag 23 has a branch 28 leading to a pressure-regulator comprising a relief-bag working within a pressure-bag 48, as hereinafter particularly described with reference to Fig. 9, and the pulsation-bag 14 has a branch 26 leading to a pressure-regulator 27 of precisely similar construction.

Referring now to Figs. 2 to 5, inclusive, the teat-press therein illustrated has inflexible walls 30 and 31, shaped in cross-section as shown in Figs. 4 and 5 and connected at their rear ends by the strip of flexible material 32, which forms a hinge, enabling the teat-press, if desired, to be opened to receive the teat. The teat may, however, be drawn through the press without opening the latter. The strip 32 extends across the front of the press and has eyelets 33 fitting over studs 34, projecting from the wall 31 of the press. The pulsating pouch 35 extends around three sides of the press, as shown, and is carried upon the inner faces of the inflexible walls 30 and 31. The pouch 36 is larger than the pouch 35 and is arranged beneath and overlapping the front of the pouch 35. A canvas cover 37 contains the two pouches to maintain them in their relative positions to limit their expansion and to combine the action of the two pouches, so that they present an unbroken front to the teat. The canvas cover is shown secured to the inflexible walls by screws 38; but it may be secured by any other usual means. The pipe 11 leads to the pouch 36, and the pipe 12 leads to the pouch 35 through the end of the teat-press.

Figs. 4 and 5 illustrate a cycle of operation. Therein Fig. 4 shows the pouches 35 and 36 both collapsed. Fluid under pressure is first admitted through the pipe 12 to the upper tubular ring or pouch 35, which is thereby distended, while the lower tubular ring or pouch 36 remains collapsed, as shown upon the left-hand side of Fig. 5. Fluid is then admitted through the pipe 11 to the pouch 36, which is thereby distended, as shown upon the right-hand side of Fig. 5. The fluid is then allowed to escape by gravity from both the pouches, which at once collapse by atmospheric pressure. It is advisable that the pressure in the upper pouch be greater than the pressure in the pouch below, so that milk may be prevented from retreating upwardly when the teat is pressed by the lower pouch.

For the purpose of inducing the pouches of the teat-presses to assume a flat rather than a crinkled shape when collapsing I may employ the flat elastic bands 105, which surround a wall and both of the pouches of the teat-press on either side.

Referring now to Fig. 1 in conjunction with Figs. 6, 7, and 8, inclusive, when four teat-presses are simultaneously employed to milk one animal the pipes 12 from the upper tubular rings or pouches of the presses are by means of the four-way branch piece 39 (shown in Fig. 6) connected to the pipe 22, leading to the pulsation-bag 23, which is shown to a larger scale in Fig. 6. The bag 23 is of canvas or some similar material, has an inner lining 40 of india-rubber or the like, and is placed beneath a lever 24, pivoted at its end upon the pin 42, fixed in the bracket 43 and having a pressure-block 44, which bears upon the bag. The lever is bifurcated at its end to receive a friction-roller 45, and a spring 46, placed between the lever and the bracket 43, normally tends to raise the block from the pulsation-bag. The cam 25 is shaped, as shown in Fig. 7, to gradually increase the pressure upon the pulsation-bag through the medium of the lever until the pressure reaches its maximum, when it remains stationary until it is suddenly released by the cam clearing the roller. The bag becoming flattened under pressure, fluid is forced out and sufficient to operate the upper tubular rings or pouches of the teat-presses is caused to pass into them through the pipes 22 and 12. The fluid remains in the upper pouches during the action of the lower pouches upon the teat and is then suddenly withdrawn, the pulsation-bag reëxpanding through the return of the fluid due to the action of gravity.

The pulsation-bag 14 is exactly similar to the pulsation-bag 23, last previously described, and is operated upon by its cam 16 through the medium of the lever 15 in a similar manner for the purpose of supplying fluid through the pipes 13 and 11 for operating the lower tubular rings or pouches of the teat-presses. The cams are relatively shaped and arranged upon the shaft 17 so that the fluid is first forced into the upper tubular rings or pouches of the teat-presses and retained therein, while the lower pouches are occupied in squeezing the milk from the teat.

To enable the pressure in the teat-presses to be regulated at will, I employ the apparatus shown in Fig. 1 and to a larger scale in Fig. 9. A similar regulating apparatus is used for each pulsation-bag, and for convenience I will describe that which is used in connection with the pulsation-bag 23. The expansible relief-bag 47 is arranged within a pressure-chamber 48, which is received by a supporting vessel 56. The relief-bag 47 communicates with the pulsation-bag 23 through a tube 28, which passes through the wall of the pressure-chamber 48 and through the dish 56. A pressure-indicating gage 57 is applied to the pressure-chamber 48 on one side of the frame, and an ordinary reciprocating hand air-pump 58 is also applied to the pressure-chamber 48, so that air may be supplied thereto. When the cam 25 commences its operation upon the pulsation-bag 23, the fluid forced therefrom into the pouch of the teat-presses expands the latter against the resistance of the teat until the pressure has risen to the limit allowed by the then pressure in the pressure-chamber 48, which is exerted upon the relief-bag 47. From this time until the end of the operation of the cam 25 all fluid displaced from the pulsation-bag and not required in the tubular rings of the teat-presses temporarily escapes into the relief-bag and inflates the same. On the pressure being withdrawn from the pulsation-bag the whole of the original charge of fluid returns thereto, the relief-bag emptying because of the aforesaid external pressure upon it.

Referring now more particularly to Figs. 10, 11, and 12, the cradle for supporting the teat-presses comprises a frame member 66, which is curved upwardly at its rear end, where it has a ring 67, and is bent at its front end to provide a rail 69. Four strips of flexible webbing 70, 71, 72, and 73 have each a loop at each end, one of the loops of each strip being threaded upon the rail 69 and the other loop being threaded upon the ring 67. Leather collars 74, 75, 76, and 77, one for each teat, have sockets 78, which are threaded upon the webbing, whereby the collars may be adjusted longitudinally thereon. They are also adjustable laterally by moving the loops of the webbing along the rail 69. The frame member 66 is secured upon the end of the arm 8 by bracket-arms 79, through which pass the screw-bolts 80.

As shown in Fig. 13, the arm 8 is mounted upon and projects laterally from the lower end of bracket 1. The object of suspending the bracket 1 from a spring and of making the collars adjustable is to allow the teat-presses to be adjusted to the udder when milking is commenced and to allow them thereafter to adjust themselves to alterations in the shape of the udder during the operation of milking. At the same time, if it should be found desirable, lifting pressure may be brought upon the udder.

To convey milk from the presses to a receptacle, I may use the U-shaped chute 173, which partially surrounds the teat-presses employed on all the teats of the animal and conducts the milk therefrom to the receptacle 174. The upper end of the chute has hooks 175, which engage in eyes 176, fixed upon the webbing of the cradle described in reference to Figs. 10, 11, and 12.

The teat-presses are supported from the collars 74, 75, 76, and 77, to which they are secured by screws or by other usual means.

In operation the apparatus is charged with fluid through the filling-cock 177 upon the pipe 13 and through a similar cock 178 upon the pipe 22. (See Fig. 1.) The bracket is drawn down and the cradle placed under the udder of the animal with the teats projecting through the collars. The teat-presses are then closed around the teat and the presses connected to the collars, or else the teats are drawn through the presses, the latter being already closed and attached to the collars. The cam-shaft is then started to slowly revolve, the pressure-regulator having been adjusted to insure a low pressure in the pouches at the commencement of the operation. The speed of rotation of the cams is gradually increased to the desired limit, and the pressure-regulators of both upper and lower pouches are adjusted until the pressures most suitable to the individual animal being milked are gradually reached.

Having now particularly described and ascertained the nature of my said invention and in what manner the same is to be performed, I declare that what I claim is—

1. Apparatus for the purpose indicated comprising in combination a teat-press designed to receive the teat of an animal, having an inflexible outer wall and superposed pouches secured horizontally to the inner side of said outer wall, and means for supplying fluid under pulsative pressure to said pouches independently, said means comprising a flexible pulsation-bag for each pouch, independent tubes conducting the fluid from each pulsation-bag to its corresponding pouch, a lever for each pulsation-bag, cams operating the levers, a shaft upon which the cams are fixed, and means for revolving said shaft.

2. In apparatus for the purpose indicated a teat-press comprising an inflexible outer wall in two parts hinged together at one end, a releasable connection for the walls at their ends opposite to the hinge, flexible pouches forming inner flexible walls within and supported by said inflexible walls, and means for supplying fluid under pulsative pressure to said pouches independently.

3. In apparatus for the purpose indicated means for producing pulsative pressure in a teat-press, comprising in combination, a flexible bag adapted to contain fluid under pressure, a tube connecting said bag with a teat-press, a lever pivoted at one end extending across the bag, a cam operating said lever, and means for rotating the cam.

4. In apparatus for the purpose indicated means for regulating the pulsative pressure of fluid employed in a teat-press, comprising in combination, a pressure-chamber, an expansible relief-bag within the pressure-chamber, a tube through the wall of the pressure-chamber giving communication between the relief-bag and a bag employed for producing pulsative pressure in a teat-press an air-pump for forcing air into the pressure-chamber, and a gage for indicating the pressure therein.

5. The combination in apparatus for the purpose indicated of a bracket, an arm projecting laterally from the lower end thereof, a cradle carried upon the outer end of said arm and a spring from which the bracket is suspended.

6. In apparatus for the purpose indicated, a cradle comprising in combination, a frame, flexible webbing adjustable upon said frame, collars adjustable upon said webbing, and means for supporting teat-presses from the collars.

7. In apparatus for the purpose indicated the combination with a plurality of teat-presses of a U-shaped chute surrounding said presses for the purpose of conducting milk therefrom to a receptacle, and means for maintaining said chute in position.

Dated the 28th day of July, 1903.

GEORGE HUTCHINSON.

Witnesses:
   HENRIE H. RAYWARD,
   E. S. BALDWIN.